United States Patent
Iijima

[11] Patent Number: 5,929,428
[45] Date of Patent: Jul. 27, 1999

[54] FILE MANAGING METHOD REQUIRING A CHANGE IN KEY DATA AND IC CARD DEVICE USING THE METHOD

[75] Inventor: Yasuo Iijima, Yokohama, Japan

[73] Assignee: Kabushiki Kaisha Toshiba, Kawasaki, Japan

[21] Appl. No.: 08/825,387

[22] Filed: Mar. 28, 1997

[30] Foreign Application Priority Data

Mar. 29, 1996 [JP] Japan .................................. 8-076200
Sep. 30, 1996 [JP] Japan .................................. 8-278877

[51] Int. Cl.⁶ ........................... G06K 19/06; G06K 19/00
[52] U.S. Cl. ............................... 235/492; 235/487; 902/1
[58] Field of Search .................... 235/375, 492, 235/487; 902/1, 2

[56] References Cited

U.S. PATENT DOCUMENTS

| | | | |
|---|---|---|---|
| 4,734,568 | 3/1988 | Watanabe | 235/380 |
| 4,985,615 | 1/1991 | Iijima | 235/380 |
| 5,097,118 | 3/1992 | Iijima | 235/492 |
| 5,226,155 | 7/1993 | Iijima | 906/26 |
| 5,384,454 | 1/1995 | Iijima | 235/492 |
| 5,410,690 | 4/1995 | Kawata | 395/600 |
| 5,473,690 | 12/1995 | Grimonprez et al. | 902/2 |
| 5,517,014 | 5/1996 | Iijima | 235/487 |

FOREIGN PATENT DOCUMENTS

| | | |
|---|---|---|
| 212615 | 3/1987 | European Pat. Off. |
| 325506 | 7/1989 | European Pat. Off. |
| 430 257 A2 | 6/1991 | European Pat. Off. |
| 674290A2 | 9/1995 | European Pat. Off. |
| 2640783 | 6/1990 | France |
| 2687816 | 8/1993 | France |
| 3523237A1 | 1/1987 | Germany |
| 3927270A1 | 2/1991 | Germany |

*Primary Examiner*—Thien Minh Le
*Assistant Examiner*—Drew A. Dunn
*Attorney, Agent, or Firm*—Pillsbury Madison & Sutro LLP

[57] ABSTRACT

A file managing method includes a step of setting a key data of a portable storage medium having a plurality of storage areas, a step of determining whether the key data is changed, a step of inhibiting data from being processed in the plurality of storage areas when it is determined that the key data is not changed, and a step of processing data of the plurality of storage areas in response to a given command when it is determined that the key data is changed.

28 Claims, 13 Drawing Sheets

| SERIAL NUMBER | DFSN | PFSN | FID | |
|---|---|---|---|---|
| #01 | 00 | 00 | 00 | MF DEFINITION INFORMATION |
| #02 | 00 | – | 01 | K00 DEFINTION INFORMATION |
| #03 | 00 | – | 02 | K01 DEFINTION INFORMATION |
| #04 | 00 | – | 03 | D00 DEFINTION INFORMATION |
| #05 | 00 | – | 04 | D01 DEFINTION INFORMATION |
| #06 | 01 | 00 | 11 | DF1 DEFINTION INFORMATION |
| #07 | 01 | – | 01 | K11 DEFINTION INFORMATION |
| #08 | 02 | 00 | 12 | DF2 DEFINTION INFORMATION |
| #09 | 02 | – | 01 | K21 DEFINTION INFORMATION |
| #10 | 01 | – | 02 | K12 DEFINTION INFORMATION |
| #11 | 01 | – | 03 | D11 DEFINTION INFORMATION |
| #12 | 01 | – | 04 | D12 DEFINTION INFORMATION |
| #13 | 03 | 01 | 21 | DF1-1 DEFINTION INFORMATION |
| #14 | 03 | – | 01 | K111 DEFINTION INFORMATION |
| #15 | 03 | – | 02 | K112 DEFINTION INFORMATION |
| #16 | 03 | – | 03 | D111 DEFINTION INFORMATION |
| #17 | 03 | – | 04 | D112 DEFINTION INFORMATION |
| #18 | 04 | 01 | 22 | DF1-2 DEFINTION INFORMATION |
| #19 | 04 | – | 01 | K121 DEFINTION INFORMATION |
| #20 | 04 | – | 02 | K122 DEFINTION INFORMATION |
| #21 | 04 | – | 03 | D121 DEFINTION INFORMATION |
| #22 | 04 | – | 04 | D122 DEFINTION INFORMATION |
| #23 | 02 | – | 02 | K22 DEFINTION INFORMATION |
| #24 | 02 | – | 03 | D21 DEFINTION INFORMATION |
| #25 | 02 | – | 04 | D22 DEFINTION INFORMATION |
| #26 | 05 | 02 | 31 | DF2-1 DEFINTION INFORMATION |
| #27 | 05 | – | 01 | K211 DEFINTION INFORMATION |
| #28 | 05 | – | 02 | K212 DEFINTION INFORMATION |
| #29 | 05 | – | 03 | D211 DEFINTION INFORMATION |
| #30 | 05 | – | 04 | D212 DEFINTION INFORMATION |
| #31 | 06 | 02 | 32 | DF2-2 DEFINTION INFORMATION |
| #32 | 06 | – | 01 | K221 DEFINTION INFORMATION |
| #33 | 06 | – | 02 | K222 DEFINTION INFORMATION |
| #34 | 06 | – | 03 | D221 DEFINTION INFORMATION |
| #35 | 06 | – | 04 | D222 DEFINTION INFORMATION |

FIG. 6

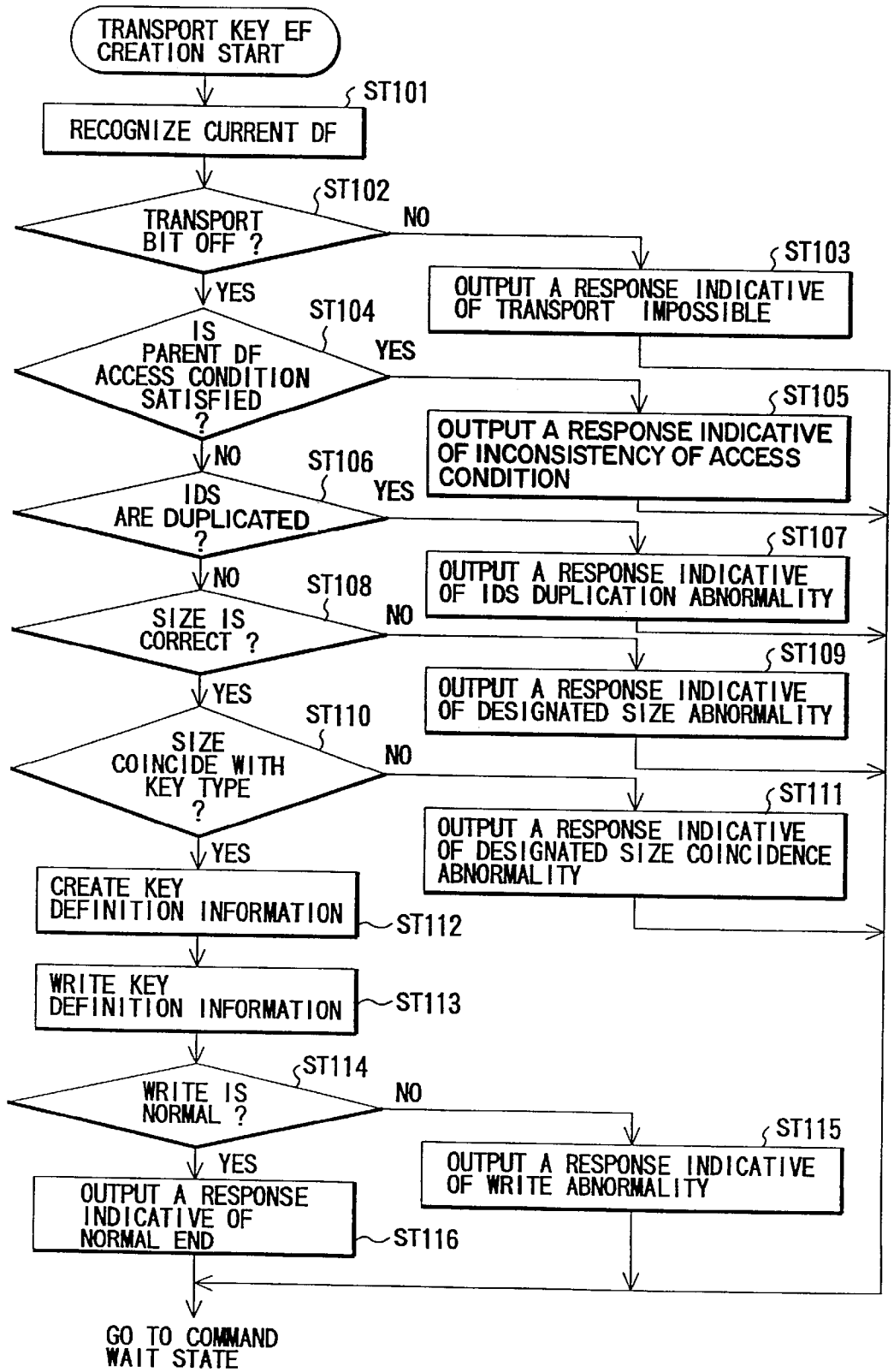
F I G. 13

FILE MANAGING METHOD REQUIRING A CHANGE IN KEY DATA AND IC CARD DEVICE USING THE METHOD

BACKGROUND OF THE INVENTION

1. Field of the Invention

The present invention relates to a method of managing a plurality of files in an IC card incorporating an IC chip having a nonvolatile memory of the files and a control device such as a CPU for controlling the nonvolatile memory.

2. Description of the Related Art

An IC card incorporating an IC chip having a nonvolatile data memory and a control unit, such as a CPU, for controlling the data memory has recently been noteworthy as a portable data storage medium. In this IC card, the data memory is divided into a plurality of files each storing data necessary for operating an application, and an identification name of the application is input from an external device to render only the file corresponding thereto usable. Since a plurality of items of application data are assigned to their corresponding files and stored in the single IC card, the IC card can thus be used widely. The files include a plurality of data files for storing transaction files and the like and a key file for storing key data.

Furthermore, in the recent IC card, information called an access condition is added to each file, and it is determined whether command access can be gained or not under condition that a directed key of the card is checked by the information.

During the reception of an IC card from its manufacturer to its user, various operations such as issuance of the card and storage of system basic information into the card, are performed, and the concerned parties vary from operation to operation. For example, one concerned with the issuance of the card is a card issuer (superordinate), while one concerned with the storage of system basic information is an application provider (subordinate). When authorization for access to the card is shifted from the card issuer to the application provider, a provisional key called "transport key" is generally set to the IC card and checked by the application provider, with the result that the application provider can gain access to the IC card afterward.

If the access condition to the file is set such that only the application provider can manage the data of the file, the card issuer cannot permanently set the transport key since there is no application provider key that the issuer must satisfy in order to set the transport key. To avoid this, there is a method for setting one of the application provider key and card issuer key as an access condition to the file. More specifically, the access condition has only to be set such that it is satisfied by collating the card issuer key when the card issuer sets a transport key of the application provider in the file and that it is satisfied by collating the application provider key when the application provider manages the data of the file. However, the access condition set in the file can be accessed by both the card issuer and application provider and, in this case, the authorization to manage data of the file is not transferred from the card issuer (superordinate) to the application provider (subordinate).

Since the transport key is known to the card issuer, the application provider generally checks and rewrites the transport key in order to prevent any person other than the application provider from getting to know the transport key.

The above-described prior art, however, complicates the problems caused when data of the IC card is altered. The period of validity for utilizing application data of the IC card is generally changed by checking the key of the application provider. If, therefore, the application data is altered, the application provider is called to account therefor.

However, when the application provider uses the unchanged transport key, the card issuer has to perform the same operation as that of the application provider. In other words, though the alteration of data is due to the application provider's carelessness, the card issuer is also suspected of the alternation of data.

It is thus impossible to completely execute "transfer of file management authorization to the IC card" which is the original object in utilizing the transport key.

To compulsorily rewrite the transport key and check it in the IC card is not realistic for application pursuing only the convenience of the IC card.

BRIEF SUMMARY OF THE INVENTION

It is accordingly an objective of the present invention to provide a file management method which is capable of invalidating a transport key of a medium or the like unless the subordinate changes the transport key after the key is transferred from the superordinate to the subordinate and thus improved in security, and a medium using the file management method.

According to one aspect of the present invention, there is a method of managing files, comprising: the steps of setting a key data of a portable storage medium having a plurality of storage areas; determining whether the password is changed; inhibiting data from being processed in the plurality of storage areas when it is determined in the determining step that the key data is not changed; and processing data of the plurality of storage areas in response to a given command when it is determined in the determining step that the key data is changed.

According to another aspect of the present invention, there is a removable storage medium having plural storage fields using the above method, comprising: means for storing a key data and data in a plurality of storage areas thereof; means for determining whether a key data stored in the storage means is changed; means for inhibiting data from being processed in the plurality of storage areas when the determining means determines that the key data is not changed; and means for processing data of the plurality of storage areas in response to a given command when the determining means determines that the key data is changed.

Unless an IC card issuer (superordinate) changes a key set by the issuer, an IC card application provider (subordinate) cannot perform an operation of writing an application into a storage area or the like. Therefore, the application provider is sure to perform an operation after the key is changed, authorization to manage the files is completely shifted, resulting in improvement in security.

Additional objectives and advantages of the invention will be set forth in the description which follows, and in part will be obvious from the description, or may be learned by practice of the invention. The objectives and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a table showing an example of a configuration of a directory set in the data memory;

FIG. 13 is a flowchart for explaining an operation of creating a transport key.

DETAILED DESCRIPTION OF THE INVENTION

An embodiment of the present invention will now be described with reference to the accompanying drawings.

Figure 1A:
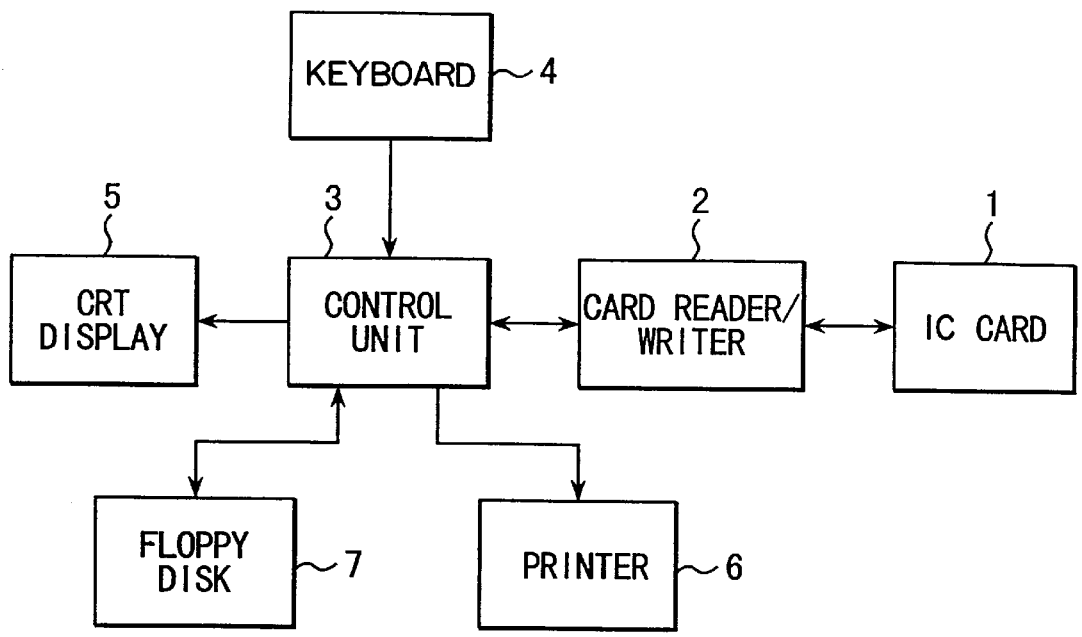
FIG. 1A is a block diagram showing an example of a configuration of a card handling apparatus to which an IC card according to an embodiment of the present invention is applied.

FIG. 1A shows a configuration of a card handling apparatus to which an IC card is applied as a portable electronic apparatus and which is used as a terminal device of a financial system, a shopping system, etc. According to this configuration, an IC card 1 can be connected to a control unit 3 comprising a CPU, through a card reader/writer 2, and a keyboard 4, a CRT display device 5, a printer 6 and a floppy disk drive 7 are connected to the control unit 3.

Figure 2:
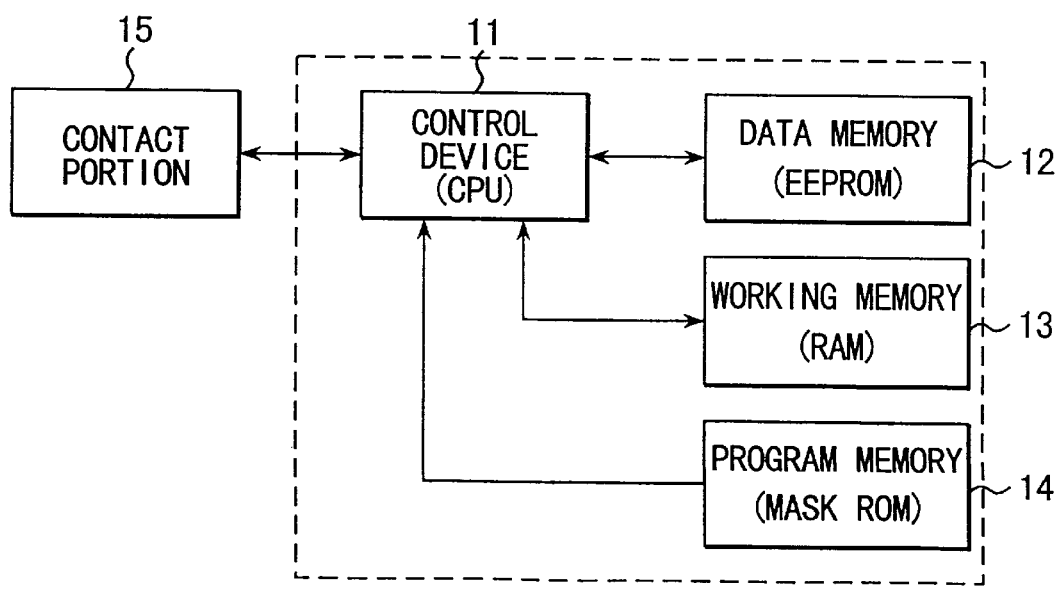
FIG. 2 is a block diagram showing an example of a configuration of the IC card.

FIG. 2 illustrates a configuration of the IC card 1. The IC card 1 includes a control device (e.g., CPU) 11, a nonvolatile data memory 12 capable of erasing data stored therein, a working memory 13, a program memory 14, and a contact portion 15 for getting electrical contact with the card reader/writer 2. Of these, the control device 11, data memory 12, working memory 13 and program memory 14, surrounded with a broken line in FIG. 2, is formed by one IC chip (or a plurality of IC chips) and as known in JIKKAIHEI2-17, 381, the IC chip 10 and the contact portion 15 are formed as a IC module and buried into the body of the IC card.

The data memory 12 constitutes, e.g., an EEPROM and stores various types of data. The working memory 13 is formed of, e.g., a mask ROM and temporarily holds data processed by the control device 11. The program memory 14 is constituted of, e.g., a mask ROM and stores programs of the control device 11.

Further, a program performing each of the routines of FIG. 7 to FIG. 13 mentioned later is stored in a program memory 14.

Figures 3, 4:
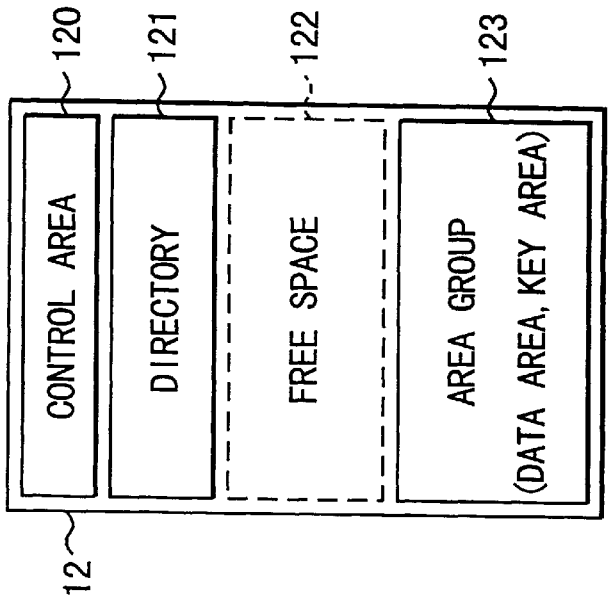
FIG. 3 is a memory map illustrating an example of a configuration of a data memory.
FIG. 4 is a view showing an example of a format of various types of definition information.

The data memory 12 is divided into a control area 120, a directory 121, a free space 122 and an area group 123, as illustrated in FIG. 3. The area group 123 has a plurality of data areas and a key area and can be grouped by the concept called data file (DF). The master files (MF), which will be described later, are managed together as one form of the data files.

The data files are ones for managing a key area and a data area used for a corresponding application together. The data area is one for storing data which is read or written when necessary, such as transaction data. The key area is one for storing an identification number and the like. Data is written, rewritten and checked in the key area but cannot be read out therefrom. As described above, the data and key areas are included together in the data memory 12 as the area group 123. The respective physical locations of the files and areas are recognized by the control device 11 using the directory 121 in the data memory 12.

Figure 1B:
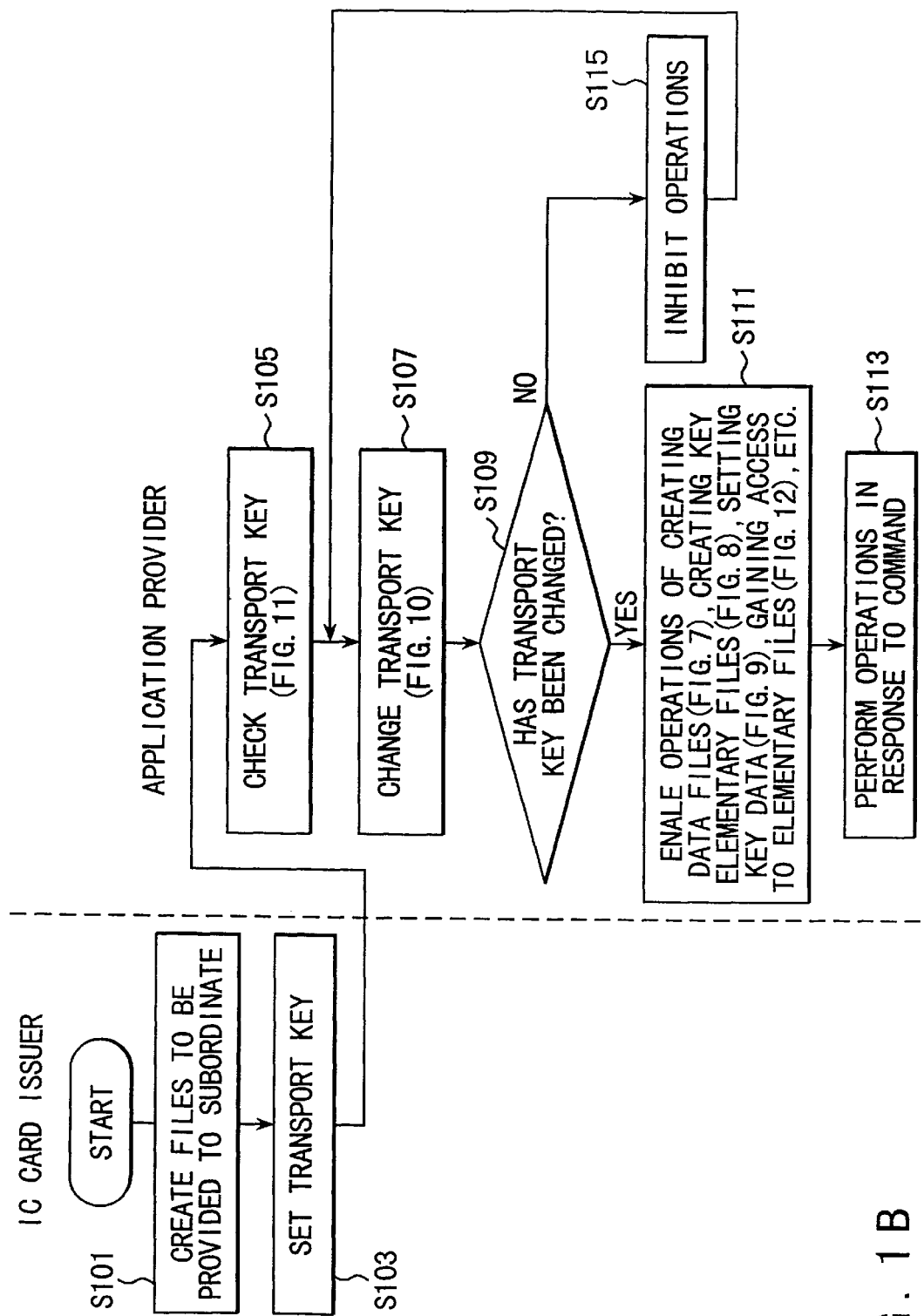
FIG. 1B is a flowchart for explaining an operation of the IC card of the present invention.

A file managing method according to the present invention will now be summarized with reference to the flowchart of FIG. 1B.

A medium such as an IC card to which the method is applied, is manufactured by an IC card issuer (S101) who sets a transport key in the IC card (S103). The IC card is handed to an application provider who creates an application and stores it in a file of the IC card.

The application provider mounts the IC card on an IC reader and inputs and checks the transport key (S105), thus gaining access to the IC card. The transport key is changed to one exclusively for an application supplier (S107). Thus, the IC card cannot be accessed by the former transport key, and the authorization to manage the files is completely shifted from the IC card issuer to the application provider. If it is confirmed that the transport key is changed (S109), the operations of creating data files (FIG. 7), creating key elementary files (FIG. 8), setting key data (FIG. 9), gaining access to elementary files (FIG. 12), etc. can be performed in accordance with a given command.

If the transport key is not changed, none of the above operations are carried out even when the original transport key set by the IC card issuer is inputted. If a trouble rewriting the files or the like occurs after the transport key is changed, its responsibility rests with the application supplier who has changed the transport key. In this case, an operation of changing the transport key can be performed. Consequently, the authorization to manage the files of the IC card can be transferred completely between the IC card issuer (superordinate) and application provider (subordinate).

The control area 120 of the data memory 12 shown in FIG. 3 stores the leading address information of the area group 123 and that of the free space 122.

The directory 121 of the data memory 12 stores various types of definition information corresponding to the data files and areas, as illustrated in FIG. 4.

The definition information 201 shown in FIG. 4 defines the name of a data file and constitutes data PTN for identifying data file name definition information in the directory 121, file serial number DFSN assigned to the present data file, file serial number PFSN of parent file of the present data file, file name $DF_{name}$ assigned to the present data file, data NL representing the length of the file name, and data BCC for checking the validity of these data.

The definition information 202 shown in FIG. 4 defines the management information of a data file and constitutes data PTN for identifying data file name definition information in the directory 121, file serial number DFSN assigned to the present data file, file serial number PFSN of parent file of the present data file, data file size DFS, AAID for identifying a data area in which additional information of the present data file is stored, TYPE for determining whether the additional information is output or not, UCF for inhibiting a type of the key, DFAC indicative of access condition of the data file, DFST for holding the states of the present data file, the number US of bytes used by data files subordinated to the present data file and areas, and data BCC for checking the validity of these data.

Here, a specific bit (for example 8th bit) of DFST is used as a transport bit meaning where the transport key of the DF is changed.

In particular, when a data file is selected in a data file selection command, which will be described later, the AAID outputs the contents of the data areas shown on the selected file if necessary.

The definition information 203 shown in FIG. 4 defines an area for storing various types of transaction data and is constituted of data PTN for identifying area definition information in the directory 121, a serial number DFSN of a data file to which this area belongs, an identification number AID for gaining access to the area, ATOP representing the leading address of the area, ASIZ indicative of the size of the area, AAC representing access conditions of the area, AST for holding the state of the area, and data BCC for checking the validity of these data.

The definition information 204 shown in FIG. 4 defines an area for storing various types of key data and constitutes data PTN for identifying key area definition information in the directory 121, a serial number DFSN of a data file to which this area belongs, an identification number kID for gaining access to the area, KTOP representing the leading address of the area, KSIZ indicative of the size of the area, CF indicative of the type of a key, KAC representing access conditions of the key, KST for holding the state of the key, and data BCC for checking the validity of these data.

The above data PTN is made up of, e.g., one byte, and "00", "01", "02" and "03" are applied to the information 201, 202, 203 and 204, respectively.

Figure 5:
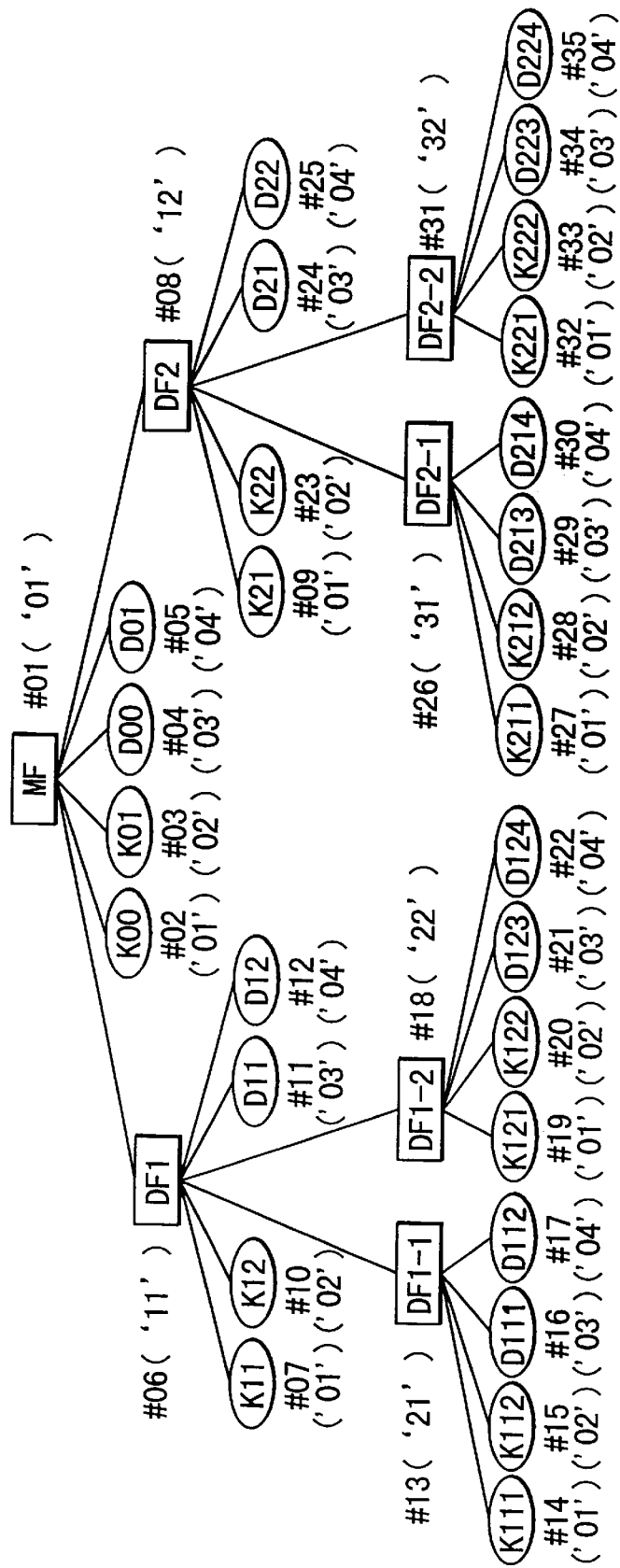
FIG. 5 is a view illustrating an example of a configuration of files set in the data memory.

FIG. 5 illustrates an example of a configuration of files. In this figure, DFnn indicates a data file, Dnn shows a data area, and Knn represents a key area.

As illustrated in FIG. 5, data files DF1 and DF2, key areas K00 and K01, and data areas D00 and D01 are subordinated to a master file MF. Data files DF1-1 and DF1-2, key areas K11 and K12, and data areas D11 and D12 are subordinated to the data file DF1. Key areas K111 and K112 and data areas D111 and D112 are subordinated to the data file DF1-1, while key areas K121 and K122 and data areas D121 and D122 are subordinated to the data file DF1-2.

Data files DF2-1 and DF2-2, key areas K21 and K22 and data areas D21 and D22 are subordinated to the data file DF2. Key areas K211 and K212 and data areas D211 and D212 are subordinated to the data file DF2-1, while key areas K221 and K222 and data areas D221 and D222 are subordinated to the data file DF2-2.

The above items of definition information are stored together in the directory 121, as shown in FIG. 6. A DFSN (data file serial number) is automatically assigned to each item of definition information when a file is created. The control device 11 recognizes a relationship among the files in accordance with the DFSN and the serial number of the parent file (PFSN) in which the data file definition information is stored.

For example, in the definition information (serial number #13) of data file DF1-1, DFSN is "03" and PFSN is "01". More specifically, when this data file is created, a data file serial number (DFSN) "03" is assigned thereto and at the same time it is recognized that the data file is subordinated to DF1, and the DFSN "01" of the DF1 is assigned to the data file DF1-1 as a parent file serial number PFSN.

Figure 7:
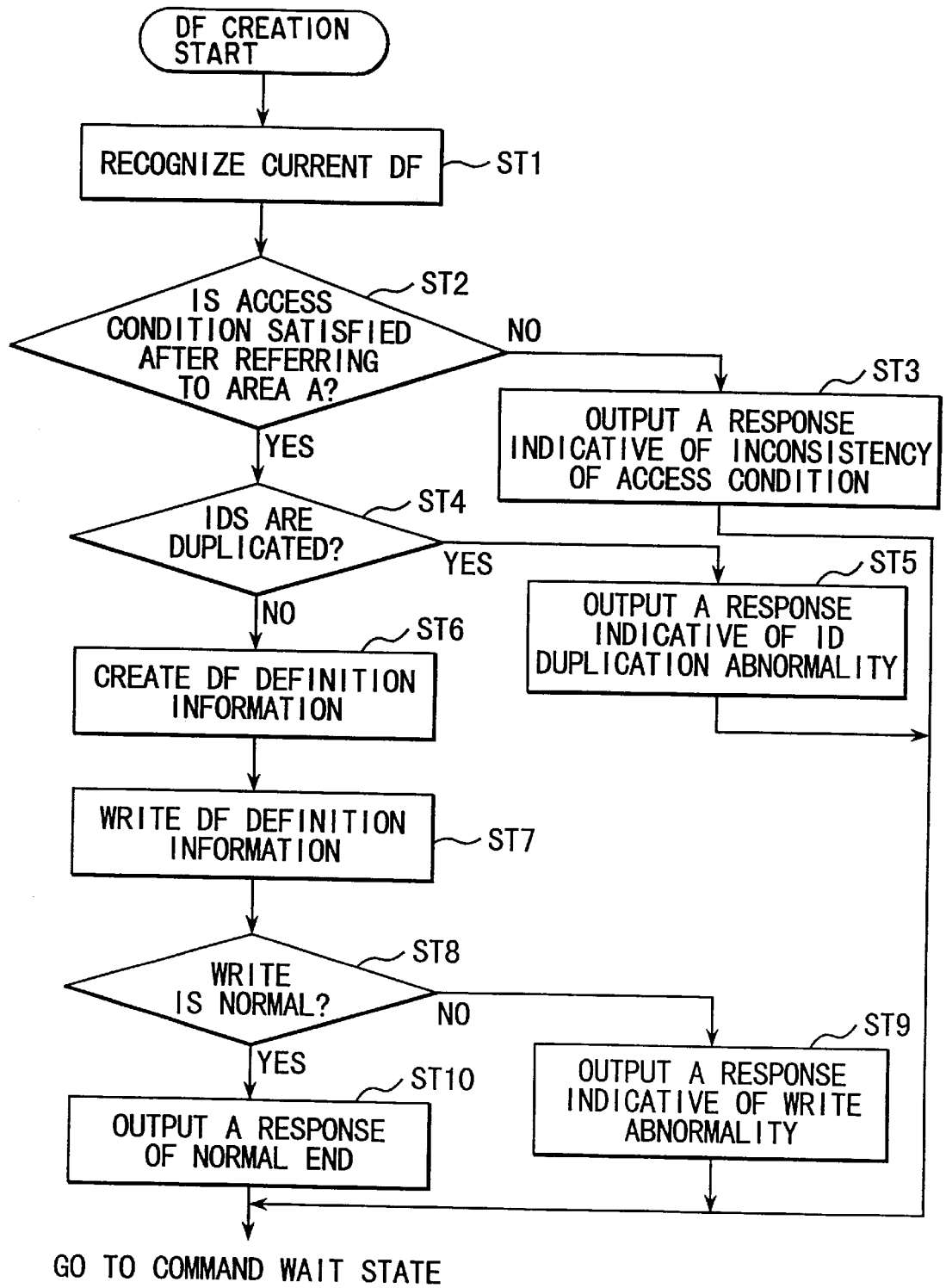
FIG. 7 is a flowchart for explaining an operation of creating a data file.

FIG. 7 is a flowchart for explaining an operation of creating a data file (DF). This operation will now be described.

When the IC card 1 receives a data file creation command from outside, it recognizes a data file in a usable state or in a current state (hereinafter referred to as current DF) (ST1). In particular, the current DF serves as a master file (MF) immediately after the IC card 1 is electrically activated.

If the current DF is recognized, then an access condition for creating a file is referred to from among access conditions of the current DF definition information. The access condition is compared with only collation state holding area A of a RAM (described later) to determine whether the collation state of a key is established by request of the access condition (ST2).

If it is not established, a response telegram indicative of inconsistence of the access conditions is outputted (ST3), thus returning to a command wait state. On the other hand, if it is done, then the name (DF-ID) of a data file is extracted from a command to confirm whether there is data file definition information having parent FSN which is equal in value to FSN of the current DF and also having the same file name as the above extracted name (ST 4).

If the data file definition information is present, a response telegram representing ID duplication abnormality is outputted (ST5), and the flow returns to the command wait state. If it is not present, data file definition information, as shown in FIG. 4, is created by data file creating data supplied in response to a command (ST6) and then written to a predetermined area (ST7).

If the data file definition information is not normally written (ST8), a response telegram indicative of abnormal write is outputted (ST9), and the flow returns to the command wait state. If it is normally done (ST8), a response telegram indicative of normal end is output (ST10), the flow returns to the command wait state.

Figure 8:
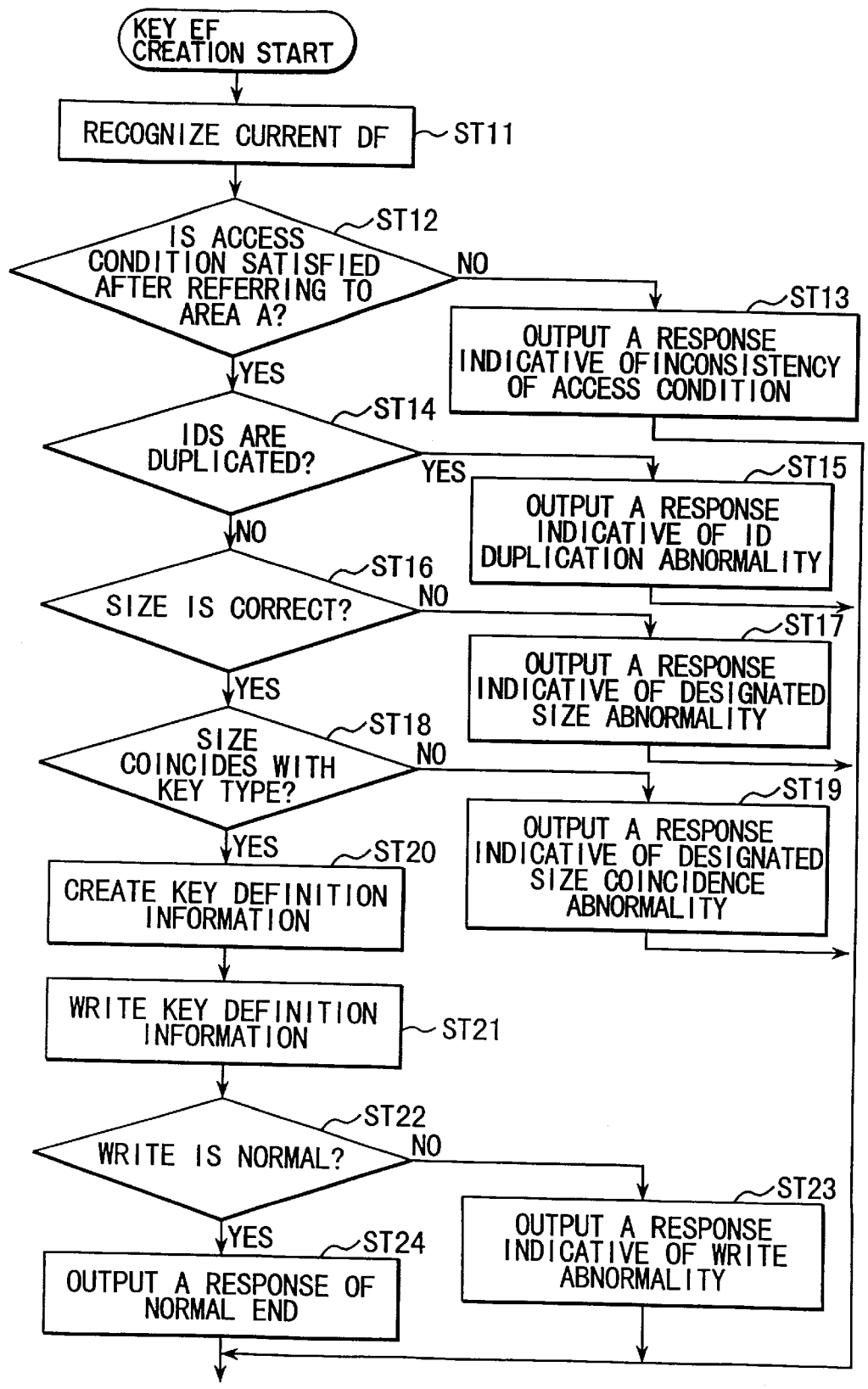
FIG. 8 is a flowchart for explaining an operation of creating a key elementary file.

FIG. 8 is a flowchart for explaining an operation of creating a key elementary file (EF). This operation will now be described.

When the IC card 1 receives a key EF creation command from outside, it recognizes the current DF (ST11).

If the current DF is recognized, then an access condition for creating a file is referred to from among access conditions of the current DF definition information. The access condition is compared with only collation state holding area A of a RAM (described later) to determine whether the collation state of a key is established by request of the access condition (ST12).

If it is not established, a response telegram indicative of inconsistence of the access conditions is outputted (ST13), thus returning to a command wait state. On the other hand, if it is done, then the name (EF-ID) of an elementary file is referred to from a command telegram to check whether the elementary file name is present within the current DF to be accessed (ST14). If the elementary file name is present, a response telegram representing ID duplication abnormality is outputted (ST15), and the flow returns to the command wait state.

If it is not present, the size of the key EF designated by the command telegram is compared with that of a free space within the current DF to be accessed (ST16). In this comparison, it is checked whether the size of the free space is larger than the sum of the designated size of the key EF and the size of directory information used for creating the key EF. When the sum is larger, a response telegram indicating that the designated size is abnormal is outputted (ST17), and the flow returns to the command wait state.

If the sum is not larger, then the correctness of the size is checked by the type of a key designated by the command telegram (ST18). When the key is a authentication related one and the size is for example 10 bytes or when the key is a collating one and the size is for example 3 to 18 bytes, it is determined that the size is correct. If it is not correct, a response telegram representing that the collation of the designated size is abnormal is outputted (ST19), and the flow returns to the command wait state.

When the size is correct, key EF definition information to be stored in the directory is created in response to a received command (ST20) and written to a predetermined area (ST21). The eighth bit of status information depends upon the first bit of key type information designated by the command telegram and, in other words, the value of the first bit is set to the eight bit of the status information.

The eight bit of the status information represents whether key data is changed or not. The key data is not changed when the bit is "1" and it is done when the bit is "0." Consequently, when the first bit of the key type information is "1," the eight bit of the status information is not "0" unless the key data is changed. When the first bit is "0," the eight bit is "0" regardless of whether the key data is changed or not, which means that data is tacitly rewritten.

If the key EF definition information is not normally written to the predetermined area (ST22), a response telegram indicative of abnormal write is outputted (ST23), thus returning to the command wait state. When the information is normally written (ST22), a response telegram indicative of normal end is outputted (ST24), and the flow returns to the command wait state.

Figure 9:
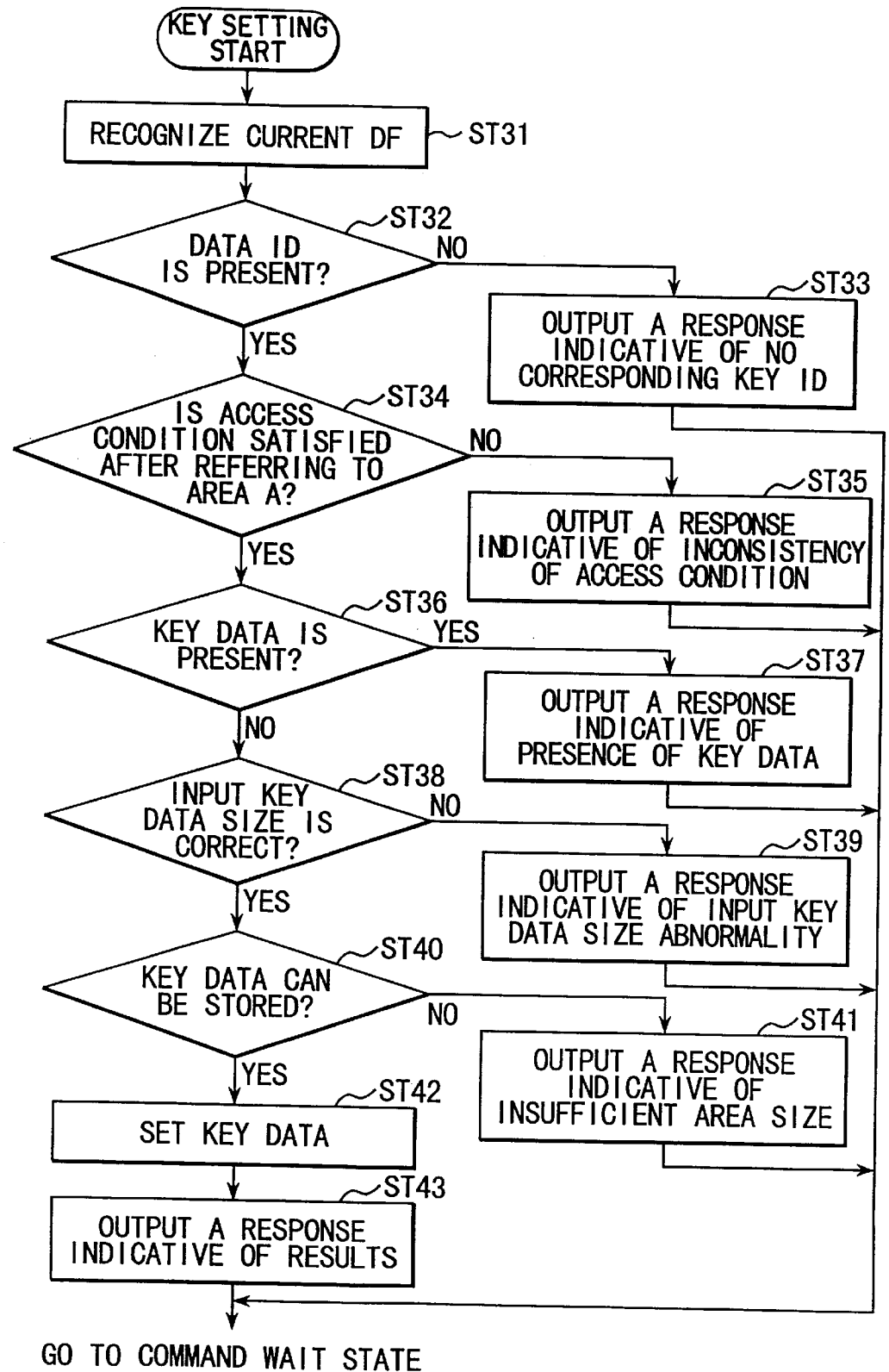
FIG. 9 is a flowchart for explaining an operation of setting key data.

FIG. 9 is a flowchart for explaining an operation of setting key data. This operation will now be described.

When the IC card 1 receives a key data setting command from outside, it recognizes the current DF (ST31).

If the current DF is recognized, the name (EF-ID) of an elementary file is referred to from a command telegram to check whether the elementary file name is present within the current DF to be accessed (ST32).

If the elementary file name is not present, a response telegram indicative of no corresponding key ID is output (ST33), and the flow returns to the command wait state.

If it is present, then an access condition for setting key data is referred to from among access conditions of the key EF definition information. This access condition is compared with only collation state holding area A of the RAM (described later) to determine whether the collating state of the key is established by request of the access condition (ST34).

If it is not established, a response telegram indicative of inconsistence of the access conditions is outputted (ST35), thus returning to the command wait state. On the other hand, if it is done, then it is confirmed whether the key data is present within its corresponding key EF area (ST36).

If the key data is present, a response telegram indicating that the key data has been present is output (step ST37), and the flow returns to the command wait state. If it is not present, then the correctness of the size of input key data is checked by the type of a key designated by the command telegram (ST38). When the key is a authentication related one and the size is for example 8 byte and when the key is a collating one and the size is for example 1 to 16 bytes, it is determined that the size is correct. If it is not correct, a response telegram representing that the size of the input key data is abnormal is outputted (ST39), and the flow returns to the command wait state.

When the size is correct, the size defined in the key EF definition information and the size of the input key data are compared with each other (ST40). If the sum of the latter size and "2" is larger than the former size, a response telegram indicative of insufficient area size is outputted (ST41), and the flow returns to the command wait state. If the sum is not larger, one-byte information and one-byte BCC are added to the key data input in response to the received command, and stored in the key EF area (ST42). The result is output as a response telegram (ST43), and the flow returns to the command wait state.

Figure 10:
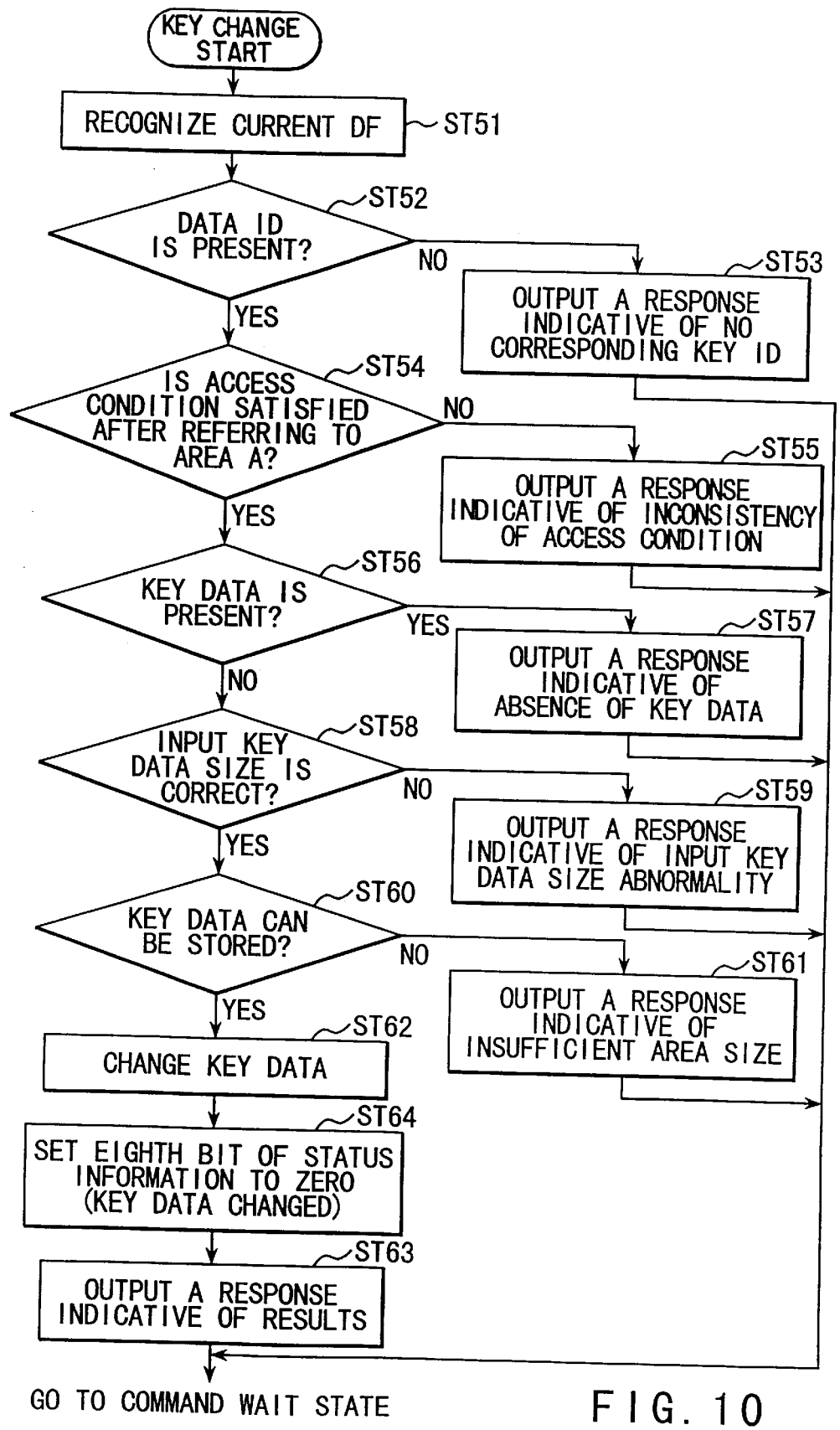
FIG. 10 is a flowchart for explaining an operation of changing key data.

FIG. 10 is a flowchart for explaining an operation of changing key data. This operation will now be described.

When the IC card 1 receives a key data changing command from outside, it recognizes the current DF (ST51).

If the current DF is recognized, the name (EF-ID) of an elementary file is referred to from a command telegram to check whether the elementary file name is present within the current DF to be accessed (ST52).

If the elementary file name is not present, a response telegram indicative of no corresponding key ID is outputted (ST53), and the flow returns to the command wait state.

If it is present, then an access condition for changing key data is referred to from among access conditions of the key EF definition information. This access condition is compared with collation state holding areas A and B of the RAM (described later) to determine whether the collating state of the key is established by request of the access condition (ST54).

If it is not established, a response telegram indicative of inconsistence of the access conditions is output (ST55), thus returning to the command wait state. On the other hand, if it is done, then it is confirmed whether the key data is present within its corresponding key EF area (ST56).

If the key data is not present, a response telegram indicating that no key data is present is outputted (ST57), and the flow returns to the command wait state. If it is present, then the correctness of the size of input key data is checked by the type of a key designated by the command telegram (ST58). When the key is a authentication related one and the size is for example 8 byte and when the key is a collating one and the size is for example 1 to 16 bytes, it is determined that the size is correct. If it is not correct, a response telegram representing that the size of the input key data is abnormal is outputted (ST59), and the flow returns to the command wait state.

When the size is correct, the size defined in the key EF definition information and the size of the input key data are compared with each other (ST60). If the sum of the latter size and "2" is larger than the former size, a response telegram indicative of insufficient area size is output (ST61), and the flow returns to the command wait state. If the sum is not larger, one-byte information and one-byte BCC are added to the key data input in response to the received command, and stored in the key EF area (ST62). The result is outputted as a response telegram (ST63), and the flow returns to the command wait state. The eighth bit of status information of the key EF definition information is set to "0" (ST64).

Figure 11:
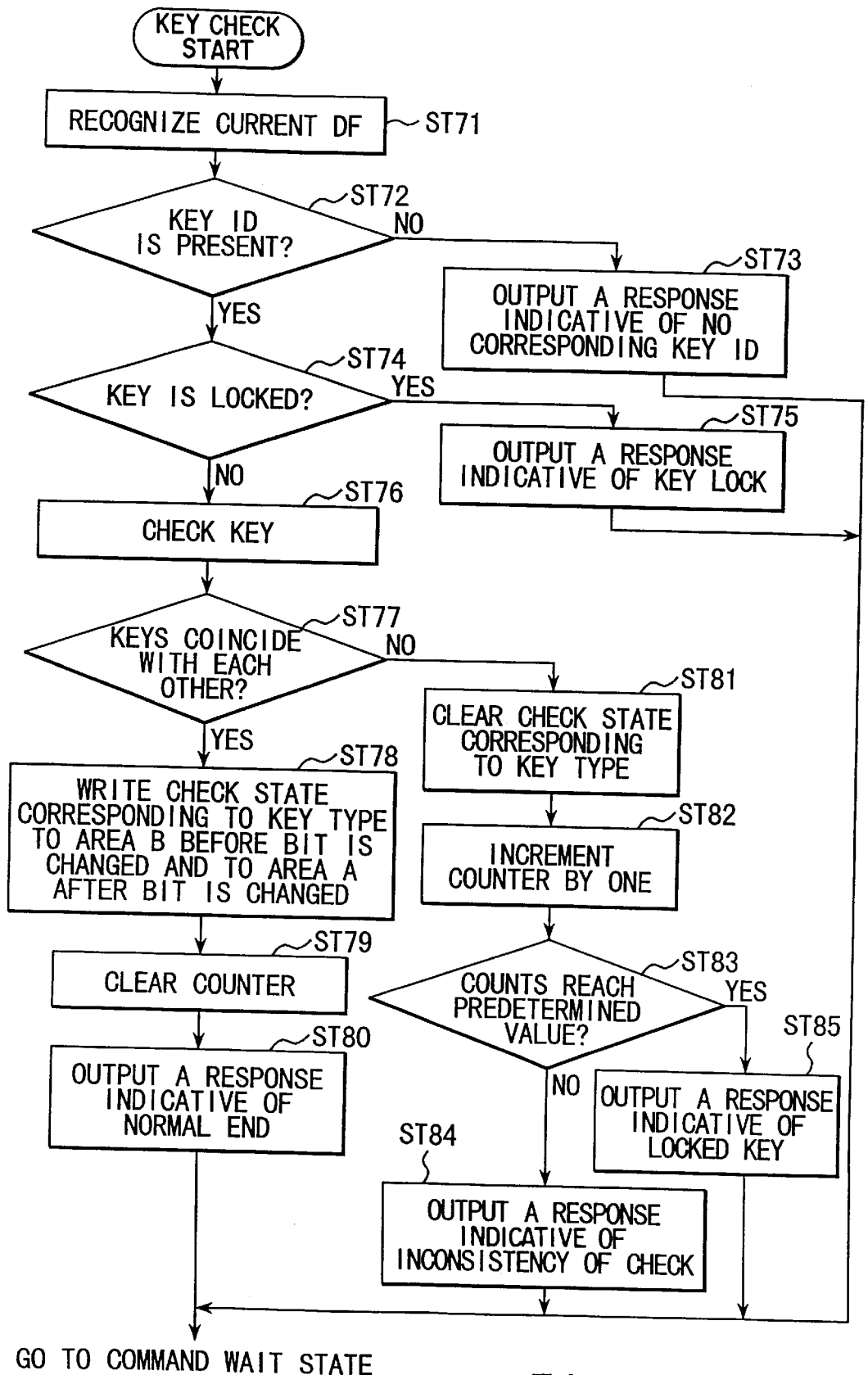
FIG. 11 is a flowchart for explaining an operation of collating a key.

FIG. 11 is a flowchart for explaining an operation of collating a key. This operation will now be described.

When the IC card 1 receives a key data changing command from outside, it recognizes the current DF (ST71).

If the current DF is recognized, the directory 121 is searched to check whether key EF definition information having a designated file name (ID) is present within the current DF (ST72).

If the key EF definition information is not present, a response telegram indicative of no corresponding key ID is output (ST73), and the flow returns to the command wait state. If it is present, it is confirmed whether the key is locked or not (ST74). When it is locked, a response telegram representing a locked key is outputted, then returns to the command wait state (ST75). If it is not present, the key data of the command telegram is collated with that stored in the key EF (ST76). When both coincide with each other (ST77), collation bit designation information is referred to from the key EF definition information to set the bit position, designated by the information, to "1" in area B before the bit is changed and in area A after the bit is changed (ST78). A collation inconsistence counter proper to the key of the key EF definition information is cleared (ST79), and a response telegram indicative of normal end is outputted (ST80). The flow then returns to the command wait state.

The RAM is divided into collation state holding areas A and B. Whether bit "1" is set to area A or B relies upon the value of the eighth bit of status information of the key EF definition information. This bit represents whether the key defined by the key EF definition information is changed or not. As described later, "0" indicates a changed key, while "1" is an unchanged key. When the bit is "0," it is set to the area A. When the bit is "1," it is set to the area B.

If the keys do not coincide with each other (ST77), the collation bit designating information and status information are referred to from the key EF definition information to set the bit of one of the areas A and B to "0" by the same procedure as above (ST81).

A collation inconsistence counter proper to the key of the key EF definition information is incremented by only one (ST82). When the counted value does not reach the maximum (ST83), a response telegram indicative of collation inconsistence is outputted (ST84), thus returning to the command wait state. When the counted value reaches the maximum, a response telegram indicating that the key has been locked is output (ST85), thus returning to the command wait state.

The collation state holding area A is referred to in creating files, key EF and key data and changing key data, while the collation sate holding area B is referred to in changing key data.

As described above, if the area A is unchanged when the key is already changed, the bit of the area B is turned on. Therefore, the key has to be changed in creating the files, key EF and key data. Furthermore, the areas A and B are referred to when the key is changed, the key can be changed regardless of whether the key has been changed or not.

Figure 12:
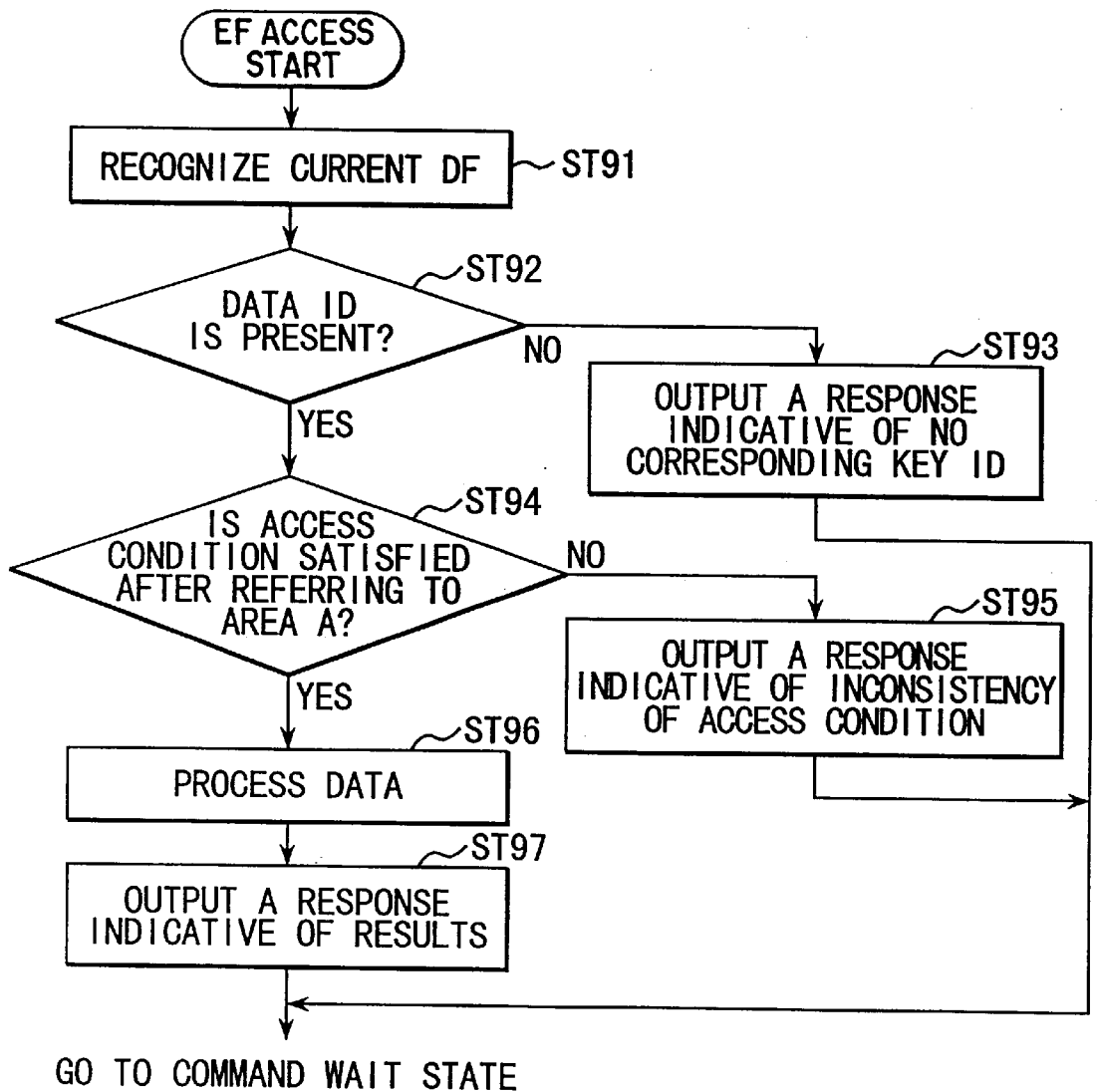
FIG. 12 is a flowchart for explaining an operation of gaining access to a data elementary file.

FIG. 12 is a flowchart for explaining an operation of gaining access to data EF. This operation will now be described.

When the IC card 1 receives a data EF access command from outside, it recognizes the current DF (ST91)

If the current DF is recognized, the name (EF-ID) of an elementary file is referred to from a command telegram to check whether the elementary file name is present within the current DF to be accessed (ST92).

If the elementary file name is not present, a response telegram indicative of no corresponding key ID is outputted (ST93), and the flow returns to the command wait state.

If it is present, then an access condition is referred to from among access conditions of the key EF definition information in accordance with an access type (read/write/change). This access condition is compared with a collation state holding area A of the RAM to determine whether the collation state of a key is established by request of the access condition (ST94).

If it is not established, a response telegram indicative of inconsistence of the access conditions is outputted (ST95), thus returning to the command wait state. On the other hand, if it is done, then a corresponding data EF area is accessed (ST96), and its results are outputted as a response telegram (ST97), thus returning to the command wait state.

As an access condition for setting a key (transport key) of an application provider, a key of its superordinate, i.e., an IC card issuer is required. This transport key cannot be changed unless its collation is performed, and it is necessary to collate the transport key when the other access commands are executed. In this case, the collation result of the transport key, which has not been changed, is stored in the collation state holding area B. Therefore, even though the other accesses necessitate the transport key, the collation result is not reflected in the collation state holding area A used for these accesses and, in this case, the transport key has no effect.

Since both the areas A and B are referred to in order to change the transport key, the established collation state can be checked and thus a change in the transport key is permitted.

Furthermore, the collation state is reflected in the collation state holding area A by collating the changed key, the effect of the key is produced.

In the above embodiment of the present invention, it is possible to determine whether a pseudo change in the key is caused according to the type of the key input when the key EF is created. Thus, the superordinate card issuer selectively sets various types of keys by respective requests of the application provider.

In the above embodiment, it is during the key EF creation command processing when status information representing whether the key is previously changed is set by the key type information. However, the status information can be set during the command processing.

FIG. 13 is a flowchart for explaining an operation of creating a transport key elementary file (EF). This operation will now be described.

When the IC card 1 receives a transport key EF creation command from outside, it recognizes the current DF (ST101).

If the current DF is recognized, then it is checked whether the transport bit of status information DFST set in the DF is turned on or not (ST102).

If the transport bit is turned on, the command is rejected, and a response telegram indicative of impossible transport is outputted, thus returning to a command wait state (ST103). If the transport bit is turned off, the command is allowed. The transport bit is turned off when the data file is created, and it is turned on when the transport key is changed in response to a key changing command.

If the transport key EF creation command is allowed, then a access condition to the parent data file (DF) of the current DF is referred to. This condition is compared with the collation state holding area A of the RAM to determine whether the collation state of the key is established or not by request of the access condition (ST104).

If it is not established, a response telegram indicative of inconsistence of the access conditions is outputted (ST105), thus returning to a command wait state. On the other hand, if it is done, then the name (EF-ID) of an elementary file is referred to from a command telegram to check whether the elementary file name is present within the current DF to be accessed (ST106). If the elementary file name is present, a response telegram representing ID duplication abnormality is outputted (ST107), and the flow returns to the command wait state.

If it is not present, the size of the key EF designated by the command telegram is compared with that of a free space within the current DF to be accessed (ST108). In this comparison, it is checked whether the size of the free space is larger than the sum of the designated size of the key EF and the size of directory information used for creating the key EF. When the sum is larger, a response telegram indicating that the designated size is abnormal is outputted (ST109), and the flow returns to the command wait state.

If the sum is not larger, then the correctness of the size is checked by the type of a key designated by the command telegram (ST110). When the key is an authentication related one and the size is for example 10 bytes or when the key is a collating one and the size is for example 3 to 18 bytes, it is determined that the size is correct. If it is not correct, a response telegram representing that the collation of the designated size is abnormal is outputted (ST111), and the flow returns to the command wait state.

When the size is correct, key EF definition information to be stored in the directory is created in response to a received command (ST112) and written to a predetermined area (ST113). The eighth bit of status information depends upon the first bit of key type information designated by the command telegram and, in other words, the value of the first bit is set to the eight bit of the status information.

The eighth bit of the status information represents whether key data is changed or not. The key data is not changed when the bit is "1" and it is done when the bit is "0." Consequently, when the first bit of the key type information is "1," the eighth bit of the status information is not "0" unless the key data is changed. When the first bit is "0," the eighth bit is "0" regardless of whether the key data is changed or not, which means that data is tacitly rewritten.

If the key EF definition information is not normally written to the predetermined area (ST114), a response telegram indicative of abnormal write is outputted (ST115), thus returning to the command wait state. When the information is normally written (ST114), a response telegram indicative of normal end is outputted (ST116), and the flow returns to the command wait state.

A procedure for creating a file for an IC card having the above constitution will now be described.

Figure 14:
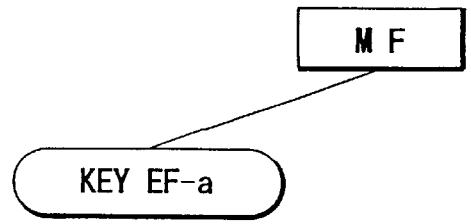
FIG. 14 to FIG. 16 are views illustrating operations of each data creations.

First, in order to set (create) an elementary file of a transport key, which is to be handed to a card issuer, when the IC card is manufactured, key EF-a, which is subordinated to a master file MF, as shown in FIG. 14, is created and a transport key is set therein according to the flowchart of FIG. 13.

A key is set in the key elementary file EF-a in accordance with the flowchart of FIG. 9. The key is set, referring to a key setting access condition given to the key EF-a.

Figure 15:
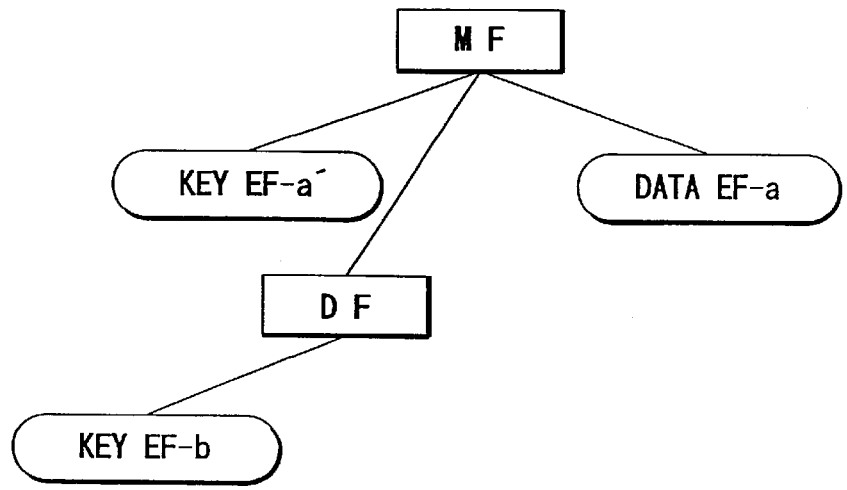

When the card issuer receives the card in this state, he or she changes the transport key in accordance with the flowchart of FIG. 10. In other words, as shown in FIG. 15, the card issuer changes the transport key set by the manufacturer to a key a' which is known to only the card issuer. To do this, the issuer refers to a key changing access condition set in the key EF. Then, the transport bit given to the master file MF is turned on and, after that, a key subordinated to the master file MF is rejected by the manufacturer.

The card issuer creates data EF-a under the master file MF for himself or herself and then refers to an EF creating access condition set in the master file MF. The card issuer also creates a data file DF, which is to be opened to the application provider, under the master file MF. The issuer sets the data file DF in accordance with the flowchart of FIG. 7 while referring to an access condition for creating the data file DF set in the master file MF.

The card issuer creates a transport key EF-b, which is to be handed to the application provider, under the data file DF. The transport key EF-b is created in accordance with the flowchart of FIG. 13, referring to not an access condition assigned to the data file DF but that assigned to the master file MF which is a parent file of the data file DF.

The card issuer sets a transport key in the transport key EF-b. This transport key is set in accordance with the flowchart of FIG. 9, referring to an access condition for setting the key, which is assigned to the key EF-b.

Figure 16:
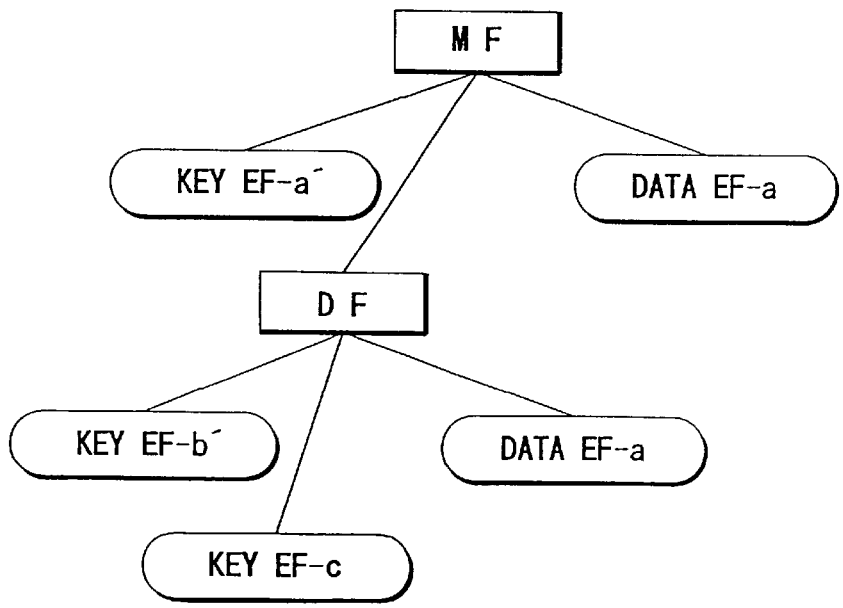

When the application provider receives the card in this state, he or she changes the transport key set by the card issuer to a key b' which is known to only the application provider as shown in FIG. 16. To do this, the application provider refers to a key changing access condition set in the key EF. Then, the transport bit given to the data file DF is turned on and, after that, a key subordinated to the data file DF is rejected by the card issuer.

The application provider creates data EF-b under the data file DF for himself or herself. The data EF-b is created in accordance with the flowchart of FIG. 7, referring to an EF creating access condition set in the data file DF. The application provider also creates a key EF-c under the data file DF for himself or herself. The key EF-c is created in accordance with the flowchart of FIG. 8, referring to an EF creating access condition set in the data file DF.

The following are commands for the IC card of the present invention. Of the commands, a normal key EF creating command and a transport key EF creating command differs from each other in command code. The IC card identifies the contents of the commands on the basis of the command code. More specifically, data is processed in accordance with the flowchart of FIG. 13 when the transport key EF creating command is identified, while data is processed in accordance with the flowchart of FIG. 8 when the normal key EF creating command is identified.

Area (Elementary File) Creating Command
Command Code A/AID(EF-ID)/ASIZ/AAC
Key EF Creating Command
Command Code B/KID/KSIZ/CF/AAC
Transport Key EF Creating Command
Command Code C/KID/KSIZ/CF/AAC When the transport key EF is created under the current DF as described above, the access condition of the parent DF of the current DF is referred to. The access condition of the parent DF is set by the superordinate, and the transport key EF can be created by the superordinate.

When a transport key EF is set to the transport key EF, the access condition of the transport key EF is referred to. This access condition is set by the superordinate when the transport key EF is created and determined such that the transport key can be set to the transport key EF.

When the application provider sets the key EF under the current DF, he or she refers to the access condition for creating the key EF of the current DF.

However, after the transport key is changed, only the application provider can execute the processing (creation of data EF and key EF) using the access condition of the current DF. Therefore, the access right can be clearly divided.

If the superordinate sets a key as a key EF creating access condition after the transport key is changed, the application provider sets a key EF used by himself or herself after the transport key is changed and prepares an environment in which the access condition of the current DF can be satisfied by collation bit designating information of definition information of the key EF. Collating the key of the application provider, the access condition of the current DF is satisfied and the data EF can be created. By doing so, the superordinate sets the access condition of the current DF, but only the application provider satisfies the access condition of the current DF without being concerned with the contents of the access condition.

As described above, according to the embodiment of the present invention, the key required for creating the EF (or DF) under the data file DF, is determined by the access condition given to the data file DF, and the access condition can be achieved without designating the superordinate key (in this embodiment the card issuer is a superordinate of the application provider). Thus, the file (memory area) that the application provider wishes to manage can be protected by only the key of the application provider. Consequently, the card issuer is not concerned with the data file (DF) and the authorization to gain access to the file (memory area) is transferred from the card issuer to the application provider.

According to the embodiment of the present invention, the transport bit is turned off when the data file DF is created and it is turned on when the transport key itself is changed by the key changing command. However, for example, the transport bit can be turned on by a different command without being associated with the key changing command. In this case, the access condition used when the command is executed is set in a target file.

As described above, according to the embodiment of the present invention, there is a method of managing access to a memory wherein the superordinate is not concerned with the data file and the authorization to manage access to the data file or memory area can be transferred from the superordinate to the subordinate.

In the above embodiment, the IC card is used as an electronic apparatus for managing files. The present invention is not limited to this, but can be applied to an electronic apparatus having a memory requiring file management.

As described above in detail, according to the present invention, there is a file management method which is capable of invalidating a transport key of a medium or the like unless the subordinate changes the transport key after the key is transferred from the superordinate to the subordinate and thus improved in security, and a medium using the file management method.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. A file managing method of dividing a memory area into plural files to use them and transporting files from a superordinate to a subordinate, comprising:

setting, at the subordinate, a transport key for transporting the files;

verifying, at the subordinate, the set transport key for transporting the files;

when the verifying is correct, changing the transport key to the key of the subordinate;

determining whether the transport key is changed to the key of the subordinate during the changing;

when it is determined that the transport key is unchanged, inhibiting a process for the files; and when it is determined that the transport key is changed, allowing the process for the files.

2. A file managing method according to claim 1, further comprising changing the transport key to the key of the subordinate in response to a given command when it is determined that the transport key is not changed.

3. A file managing method according to claim 1, further comprising selecting a normal operation mode in which data of a plurality of storage areas in a portable storage medium of the transport key is processed in response to a given command, regardless of results of said determining.

4. A file managing method according to claim 1, further comprising:

setting attribute information indicative of the normal operation mode to the transport key; and processing data of a plurality of storage areas in a portable storage medium of the transport key in response to a given command, irrespective of results of said determining, when the transport key includes the attribute information.

5. A file managing method according to claim 1, wherein said allowing includes creating a data file in each of a plurality of storage areas in a portable storage medium of the transport key in response to a given command.

6. A file managing method according to claim 1, wherein said allowing includes creating a file of the key data in each of a plurality of storage areas in a portable storage medium of the transport key in response to a given command and the file creating is inhibited before the key data is changed.

7. A file managing method according to claim 6, wherein said allowing includes setting data in the file of the key data in each of a plurality of storage areas in a portable storage medium of the transport key in response to a given command and the data setting is inhibited before the key data is changed.

8. A removable storage medium which divides a memory area into plural files to use them, comprising:

means for storing a transport key for transporting the files from a superordinate to a subordinate;

means for verifying the transport key stored in the storing means;

means for changing the transport key into a key of the subordinate when the verifying by the verifying means is correct;

means for determining whether the transport key is changed to the key of the subordinate during the operation of the changing means;

means for inhibiting a process for the files when the determining means determines the transport key is unchanged; and means for allowing a process for the files when the determining means determines the transport key being changed.

9. A removable storage medium according to claim 8, further comprising means for changing the transport key to the key of the subordinate in response to a given command when said determining means determines that the transport key is not changed.

10. A removable storage medium according to claim 8, further comprising means for selecting a normal operation mode in which data of a plurality of storage areas in a portable storage medium of the transport key is processed in response to a given command, regardless of results of said determining means.

11. A removable storage medium according to claim 8, further comprising:

means for storing the transport key having attribute information indicative of the normal operation mode; and means for processing data of a plurality of storage areas in a portable storage medium of the transport key in response to a given command, irrespective of results of said determining means, when the transport key includes the attribute information.

12. A removable storage medium according to claim 8, wherein said processing means includes means for creating a data file in each of a plurality of storage areas in a portable storage medium of the transport key in response to a given command and the file creating is inhibited by the inhibiting means before the transport key is changed.

13. A removable storage medium having plural storage fields, comprising:

means for storing a key data and data in a plurality of storage areas thereof;

means for determining whether an initial key data is changed by comparing the initial key data is compared with the key data stored in said storing means;

means for inhibiting data from being processed in the plurality of storage areas when said determining means determines that the key data is not changed; and means for processing data of the plurality of storage areas in response to a given command when said determining means determines that the key data is changed, wherein said processing means includes means for creating a file of the key data in each of the plurality of storage areas in response to a given command and the file creating is inhibited by the inhibiting means before the key data is changed.

14. A removable storage medium according to claim 13, wherein said processing means includes means for setting data in the file of the key data of each of the plurality of storage areas in response to a given command and the data setting is inhibited by the inhibiting means before the key data is changed.

15. A removable storage medium according to claim 13, wherein said processing means includes means of processing data in the file of each of the plurality of storage areas in response to a given command.

16. A method of managing access to a plurality of files of a memory, which allows access to the files by collating a first key, which is set in advance under the files by a superordinate of a system using the memory, with a new key, which is set by a subordinate of the system using the memory, wherein the superordinate changes the first key to a second key, which is known to only the subordinate, referring to a key changing access condition set in the first key and, when the first key is changed to the second key, the superordinate rejects creation of a key under the files.

17. A method of managing access to a tree structure file including a superordinate file and a subordinate file, comprising:

setting an access condition in the superordinate file managed by a superordinate manager;

setting an access condition in a file provided from the superordinate manager to a subordinate manager;

setting a transport key, which is to be transferred from the superordinate manager to the subordinate manager, in the subordinate file, referring to an access condition of the superordinate file;

setting the transport key in the subordinate file when the access condition of the superordinate file is satisfied; and referring to an access condition of the subordinate file and, when the access condition is satisfied, setting a file under the subordinate file.

18. The method according to claim 17, wherein the subordinate file has identification information indicating whether the transport key is allowed to be set, and the transport key is inhibited from being set in the subordinate file based on the identification information.

19. The method according to claim 18, wherein the identification information is updated so as to inhibit the transport key from being set in the subordinate file after the transport key is changed.

20. The method according to claim 18, wherein the identification information is updated in response to a special command.

21. The method according to claim 17, wherein the transport key is set in the subordinate file in response to a transport key setting command, and the file is set under the subordinate file in response to a command other than the transport key setting command.

22. A portable information processing apparatus including a tree-structure file having a superordinate file and a subordinate file, comprising:

a superordinate file in which an access condition is set and which is used by a superordinate manager;

a subordinate file in which an access condition is set and which is provided by the superordinate manager and used by a subordinate manager;

first means for referring to the access condition of the superordinate file and setting a transport key, which is to be transferred from the superordinate manager to the subordinate manager, in the subordinate file when the access condition of the superordinate file is satisfied; and second means for referring to the access condition of the subordinate file and setting a file under the subordinate file when the access condition of the subordinate condition is satisfied.

23. The apparatus according to claim 22, wherein the subordinate file includes a storage area for identification information indicating whether the transport key is allowed to be set and means for inhibiting the transport key from being set in the subordinate file based on the identification information.

24. The apparatus according to claim 22, further comprising means for updating the identification information so as to inhibit the transport key from being set in the subordinate file after the transport key is changed.

25. The apparatus according to claim 22, wherein the apparatus includes means for updating the identification information in response to a special command supplied from the external device by an operation corresponding to a command supplied from an external device.

26. The apparatus according to claim 22, wherein the first means sets the transport key in the subordinate file in response to a transport key setting command by on operation corresponding to a command supplied from an external device, and the second means sets the file under the subordinate file in response to a command other than the transport key setting command.

27. A storage medium for creating a tree-structure file having a superordinate file and a subordinate file and storing control programs for an information processing apparatus for managing access to each of the files by control means, the control programs include:

creating the superordinate file in which an access condition is set by a superordinate manager;

creating the subordinate file in which an access condition is set such that the subordinate file is provided by the superordinate manager and used by a subordinate manager;

referring to the access condition of the superordinate file and setting a transport key, which is to be transferred from the superordinate manager to the subordinate manager, in the subordinate file when the access condition of the superordinate file is satisfied; and referring to the access condition of the subordinate file and setting a file under the subordinate file when the access condition of the subordinate condition is satisfied.

28. The storage medium according to claim 27, wherein a program memory in which the control programs are stored, a data memory to which the files are assigned, a control circuit for managing access to the files, and an interface with an external device are formed in a single module.

* * * * *